US010642722B2

(12) United States Patent
Li et al.

(10) Patent No.: US 10,642,722 B2
(45) Date of Patent: May 5, 2020

(54) REGRESSION TESTING OF AN APPLICATION THAT USES BIG DATA AS A SOURCE OF DATA

(71) Applicant: International Business Machines Corporation, Armonk, NY (US)

(72) Inventors: Jeff J. Li, Parkland, FL (US); Vanessa V. Michelini, Boca Raton, FL (US); Fang Wang, Plano, TX (US); Jia Xu, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/866,086

(22) Filed: Jan. 9, 2018

(65) Prior Publication Data

US 2019/0213117 A1 Jul. 11, 2019

(51) Int. Cl.
*G06F 11/36* (2006.01)
(52) U.S. Cl.
CPC ........ *G06F 11/3688* (2013.01); *G06F 11/368* (2013.01); *G06F 11/3684* (2013.01); *G06F 11/3692* (2013.01)
(58) Field of Classification Search
CPC ............... G06F 11/368; G06F 11/3684; G06F 11/3688; G06F 11/3692; G06F 11/273;
(Continued)

(56) References Cited

U.S. PATENT DOCUMENTS 5,778,169 A    7/1998  Reinhardt
6,966,013 B2  11/2005  Blum et al.
(Continued)

FOREIGN PATENT DOCUMENTS

CN    102591772 A    7/2012
JP    2015043181 A   3/2015

OTHER PUBLICATIONS

"Database—How to write Unit Tests for functions that rely on dynamic data?," [online] Stack Overflow, Stack Exchange Inc. © 2018, [retreived Jan. 9, 2018], retrieved from the Internet: <https://stackoverflow.com/questions/10288096/how-to-write-unit-tests-for-functions-that-rely-on-dynamic-data>, 3 pg.
(Continued)

*Primary Examiner* — Wei Y Zhen
*Assistant Examiner* — Mohammed N Huda
(74) *Attorney, Agent, or Firm* — Cuenot, Forsythe & Kim, LLC

(57) ABSTRACT

An application performs a regression test by the application processing a use case. Actual output data generated by the application processing the use case can be compared to expected output data and whether the actual output data matches the expected output data can be determined. Responsive to determining that the actual output data does not match the expected output data, the actual output data can be compared to refreshed source data and whether the actual output data matches the refreshed source data can be determined. Responsive to determining that the actual output data matches the refreshed source data, an automated remedy action can be automatically selected, and the expected output data can be updated with the refreshed source data by implementing the automated remedy action.

17 Claims, 9 Drawing Sheets

(58) Field of Classification Search
CPC .. G06F 11/36; G06F 11/3604; G06F 11/3664; G06F 3/0482; G06F 3/04842
USPC ........................................................ 717/124
See application file for complete search history.

(56) References Cited

U.S. PATENT DOCUMENTS

| | | | |
|---|---|---|---|
| 7,178,063 B1 | 2/2007 | Smith | |
| 8,151,146 B2 | 4/2012 | Ostrand et al. | |
| 8,276,123 B1 | 9/2012 | Deng et al. | |
| 8,701,092 B1 | 4/2014 | Colcord | |
| 9,032,361 B2 | 5/2015 | Dhalait | |
| 9,846,638 B2* | 12/2017 | Koneru et al. | G06F 11/3688 |
| 2003/0018932 A1* | 1/2003 | Blum et al. | G06F 11/273 714/46 |
| 2005/0182664 A1 | 8/2005 | Abraham-Fuchs et al. | |
| 2005/0278577 A1* | 12/2005 | Doong et al. | G06F 11/3688 714/38.1 |
| 2006/0225048 A1 | 10/2006 | Jakubiak | |
| 2008/0115028 A1 | 5/2008 | Homer et al. | |
| 2009/0106597 A1* | 4/2009 | Branca et al. | G06F 11/3688 714/38.1 |
| 2011/0145653 A1* | 6/2011 | Broadfoot et al. | G06F 11/3688 714/38.1 |
| 2014/0278469 A1 | 9/2014 | Secci | |
| 2016/0140442 A1 | 5/2016 | Lee et al. | |
| 2018/0060210 A1* | 3/2018 | Pandey et al. | G06F 11/3688 |

OTHER PUBLICATIONS

Artzi, S. et al., "Automatic Generation of Unit Regression Tests," [online] MIT CSAIL, Retrieved from the Internet: <http://people.csail.mit.edu/akiezun/unit-regression-tests.pdf>, 11 pg, Dec. 16, 2005.

Coverity QA Team, "How to improve regression testing effectiveness by 30%?" [online] Synopsys, Inc. © 2016, Jan. 30, 2013 [retreived Jul. 8, 2016], retrieved from the Internet: <http://blog.coverity.com/2013/01/30/improving-regression-testing-effectiveness/#.V1wUJfkrKWg>, 4 pg.

"System and Method to Improve Testing Feedback in a Software Application Development Environment," [online] IP.Com Prior Art Database, Technical Disclosure IPCOM000241375D, Apr. 21, 2015, 2 pg.

Tsai, W. et al., "Scenario-based functional regression testing," In 25th Annual Int'l. Computer Software and Applications Conference, COMPSAC 2001, IEEE, 8 pg.

IBM, "Method to automatically/dynamically identify and launch the test suites, that have code updates in the new build," [online] IP.Com Prior Art Database, Technical Disclosure IPCOM000177444D, Dec. 15, 2008, 4 pg.

Jin, W. et al., "Automated behavioral regression testing," 2010 Third Int'l Cont. on Software Testing, Verification and Validation, (ICST) 137-146, Apr. 6, 2010, pp. 137-146, IEEE.

Gligoric, M. et al., "Practical regression test selection with dynamic file dependencies," In Proc. of 2015 Int'l. Sym. on Software Testing and Analysis, Jul. 13, 2015, pp. 211-222, ACM.

Zhu, F. et al., "Automating regression testing for real-time software in a distributed environment," First Int'l. Sym. on Object-Oriented Real-time Distributed Computing, ISORC 98, pp. 373-382, Apr. 20, 1998, IEEE.

Robins, J.M. et al., "Analysis of semiparametric regression models for repeated outcomes in the presence of missing data," Journal of the American Statistical Association, vol. 90, No. 429, pp. 106-121, 1995.

\* cited by examiner

| | CancerCode | CancerName | Medication | ClinicalTrial# | Phase | Recruitment | Title |
|---|---|---|---|---|---|---|---|
| 510 → | C0001 | Solid Tumour | DrugX | NCT00001 | 1 | Recruiting | Inhibition in Solid Tumors |
| 512 → | C0002 | Recurrent Breast Cancer | DrugX | NCT00002 | 1 | Suspended | Study with Y drug and Z drug |
| | ↑ 520 | ↑ 522 | ↑ 524 | ↑ 526 | ↑ 528 | ↑ 530 | ↑ 532 |

| UseCase# | CancerCode | CancerName | Medication | ClinicalTrial# | Phase | Recruitment | Title |
|---|---|---|---|---|---|---|---|
| 610 → UseCase1 | C0001 | Solid Tumour | DrugX | NCT00001 | 1 | Recruiting | Inhibition in Solid Tumors |
| 612 → UseCase1 | C0002 | Recurrent Breast Cancer | DrugX | NCT00002 | 1 | Recruiting | Study with Y drug and Z drug |
| ↑ 616 | ↑ 620 | ↑ 622 | ↑ 624 | ↑ 626 | ↑ 628 | ↑ 630 | ↑ 632 |

900

An application can perform a regression test by the application processing a use case
902

Compare actual output data generated by the application processing the use case to expected output data, and determine whether the actual output data matches the expected output data
904

Responsive to determining that the actual output data does not match the expected output data, compare the actual output data to refreshed source data and determine whether the actual output data matches the refreshed source data
906

Responsive to determining that the actual output data matches the refreshed source data, automatically select an automated remedy action, and update, using a processor, the expected output data with the refreshed source data by implementing the automated remedy action
908

FIG. 9

REGRESSION TESTING OF AN APPLICATION THAT USES BIG DATA AS A SOURCE OF DATA

BACKGROUND

The present invention relates to data processing systems, and more specifically, to regression testing.

Regression testing is a type of software testing which verifies that software which was previously developed and tested still performs properly, for example after the software is changed, for example to incorporate software enhancements, patches, configuration changes, etc. To implement regression testing, test use cases typically are run by the software to generate test results. If the test results match expected test results, this can indicate that the software still is functioning properly. If the test results do not match expected test results, this can indicate that the changes to the software has created bugs or regressions in the software.

SUMMARY

A method includes an application performing a regression test by the application processing a use case. The method also can include comparing actual output data generated by the application processing the use case to expected output data and determining whether the actual output data matches the expected output data. The method also can include, responsive to determining that the actual output data does not match the expected output data, comparing the actual output data to refreshed source data and determining whether the actual output data matches the refreshed source data. The method also can include, responsive to determining that the actual output data matches the refreshed source data, automatically selecting an automated remedy action, and updating, using a processor, the expected output data with the refreshed source data by implementing the automated remedy action.

A system includes a processor programmed to initiate executable operations. The executable operations include an application performing a regression test by the application processing a use case. The executable operations also can include comparing actual output data generated by the application processing the use case to expected output data and determining whether the actual output data matches the expected output data. The executable operations also can include, responsive to determining that the actual output data does not match the expected output data, comparing the actual output data to refreshed source data and determining whether the actual output data matches the refreshed source data. The executable operations also can include, responsive to determining that the actual output data matches the refreshed source data, automatically selecting an automated remedy action, and updating the expected output data with the refreshed source data by implementing the automated remedy action.

A computer program product includes a computer readable storage medium having program code stored thereon. The program code is executable by a data processing system to initiate operations. The operations include an application performing a regression test by the application processing a use case. The operations also can include comparing actual output data generated by the application processing the use case to expected output data and determining whether the actual output data matches the expected output data. The operations also can include, responsive to determining that the actual output data does not match the expected output data, comparing the actual output data to refreshed source data and determining whether the actual output data matches the refreshed source data. The operations also can include, responsive to determining that the actual output data matches the refreshed source data, automatically selecting an automated remedy action, and updating the expected output data with the refreshed source data by implementing the automated remedy action.

BRIEF DESCRIPTION OF THE DRAWINGS

FIG. 5 is a data table presenting an example of a data table that stores source data.

FIG. 6 is a data table presenting an example of data table that stores expected output data.

FIG. 9 is a flowchart illustrating an example of a method of updating expected output data with refreshed source data.

DETAILED DESCRIPTION

Figure 1:
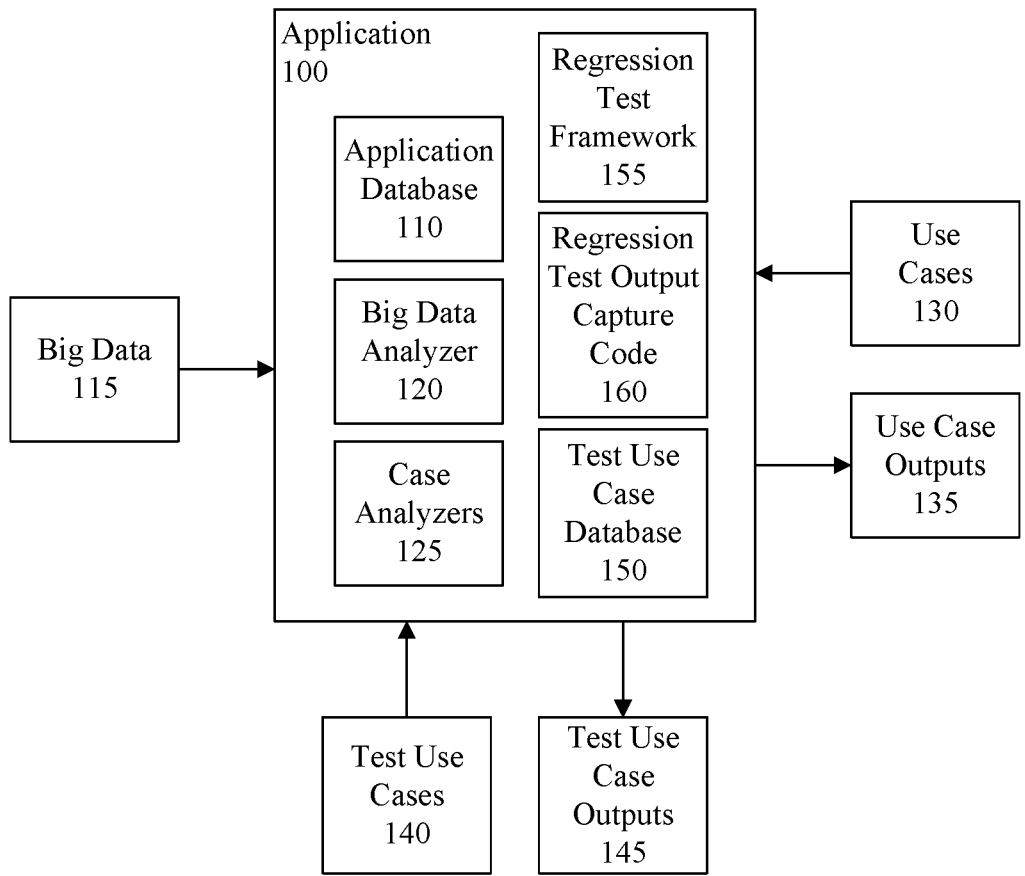
FIG. 1 is a block diagram illustrating an example architecture for an application on which regression testing is performed.

The present invention relates to data processing systems, and more specifically, to regression testing.

Arrangements described herein relate to regression testing of an application that uses big data as a source of data. Big data is a term used in the art that describes a large volume of data, which may include both structured and unstructured data, that can be analyzed for insights that lead to better decisions. The big data can be dynamic, meaning that it changes over time, sometimes constantly. For example, in the field of medical research, big data may be updated to include new, updated and/or changed source data (e.g., clinical trial information) from government agencies and medical research institutes as that source data becomes available.

Because big data is in a constant state of change, performing regression testing on applications that use big data is challenging. Test use cases and expected outputs oftentimes are used during regression testing. Specifically, actual outputs from processing test use cases are compared to the expected outputs to determine whether applications are functioning properly. The data used by the test use cases, however, may change between the time the regression testing is performed and the time when the expected outputs were generated. Thus, the actual outputs generated during the regression testing may not match the expected outputs. This can lead to a conclusion that there are defects (e.g., bugs) in the application when, in fact, the application is performing properly. Arrangements described herein improve the accuracy of regression testing, and improve the operation of data processing systems performing regression testing on applications.

Several definitions that apply throughout this document now will be presented.

As defined herein, the term regression test means an automated test that verifies whether software which was previously developed and tested still performs properly.

As defined herein, the term "use case" means a list of actions or event steps defining interactions between a role and a system (e.g., application executed by a data processing system) to achieve a goal. A role can be a user or an external system.

As defined herein, the term "test use case" means a use case used to perform a regression test.

As defined herein, the term "actual output data" means data output in real time by an application processing a use case.

As defined herein, the term "expected output data" means data expected to be output by an application processing a use case.

As defined herein, the term "source data" means data obtained from one or more data sources. An example of source data is big data received from one or more external data sources.

As defined herein, the term "refreshed source data" means source data that has been added, updated and/or changed since source data was previously received. For example, source data can be received, and at a later point in time that source data can be updated and/or changed, or new source data can be added.

As defined herein, the term "trial data" means source data generated for testing performed to determine the performance, qualities or suitability of something. An example of trial data is clinical trial data representing the definition of a clinical trial (e.g. recruiting status, indication, patient condition, etc.).

As defined herein, the term "remedy action" means a computing process implemented to correct and/or update data.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a block diagram illustrating an example architecture for an application 100 on which regression testing is performed. The application 100 can include an application database 110, or the application 100 can be communicatively linked to the application database 110. For example, the application database 110 can be hosted by a data processing system that hosts the application 100 or can be hosted by a data processing system to which the application 100 is communicatively linked via one or more communication networks.

The application database 110 can store big data 115 collected from one or more external systems. The application 100 can include a big data analyzer 120 configured to analyze the big data 115 to identify in the big data 115 data pertinent to the application 100, and store the identified information in the application database 110. For example, the big data analyzer 120 can extract and cleans the big data 115, and store the cleansed data to the application database 110 using known data cleansing techniques. Because big data 115 from external sources may be changing frequently (or constantly), the big data analyzer 120 can refresh and update the application database 110, for example periodically, to synchronize the stored data with the big data 115 stored by the external sources.

The application 100 also can include case analyzers 125. The case analyzers 125 can be configured to, in a production mode, analyze use cases 130 received by the application 100 (e.g., use cases presented by users of the application 100), reference data in the application database 110 pertinent to the use cases 130, and output analytical results as use case output 135. The analytical results can include information from the application database 110 applicable to the use case 130. In illustration, a use case 130 can include a patient's medical information, including medical symptoms the patient may be exhibiting/suffering. The case analyzers 125 can analyze the use case 130, identify in the application database 110 data pertinent to the patient's medical information, analyze the identified data in the context of the patient's medical information, and generate corresponding analytical results as use case output 135. The analytical results can include any of a variety of information, such as clinical trial information.

The case analyzers 125 also can process test use cases 140 and generate test use case outputs 145 resulting from such processing. The test use cases 140 and test use case outputs 145 can be stored in a test use case database 150. The application 100 include the test use case database 150, or the application 100 can be communicatively linked to the test use case database 150, for example as previously described with respect to the application database 110.

The application 100 also can include a regression test framework 155. The regression test framework 155 can be used to perform regression testing in the application 100. The regression test framework 155 can automatically generate regression test output capture code 160 used by the case analyzers 125 to capture and save regression testing results during a regression testing mode. The regression testing results can include actual outputs generated by the case analyzers 125 processing test use cases 140, and results of a comparison of the actual outputs to expected outputs, which are based on previously generated test use case outputs 145. The regression test framework 155 can automatically instrument the case analyzers 125 with the regression test output capture code 160 for use during regression testing. Further operations performed by the regression test framework 155 will be described herein.

Figure 2:
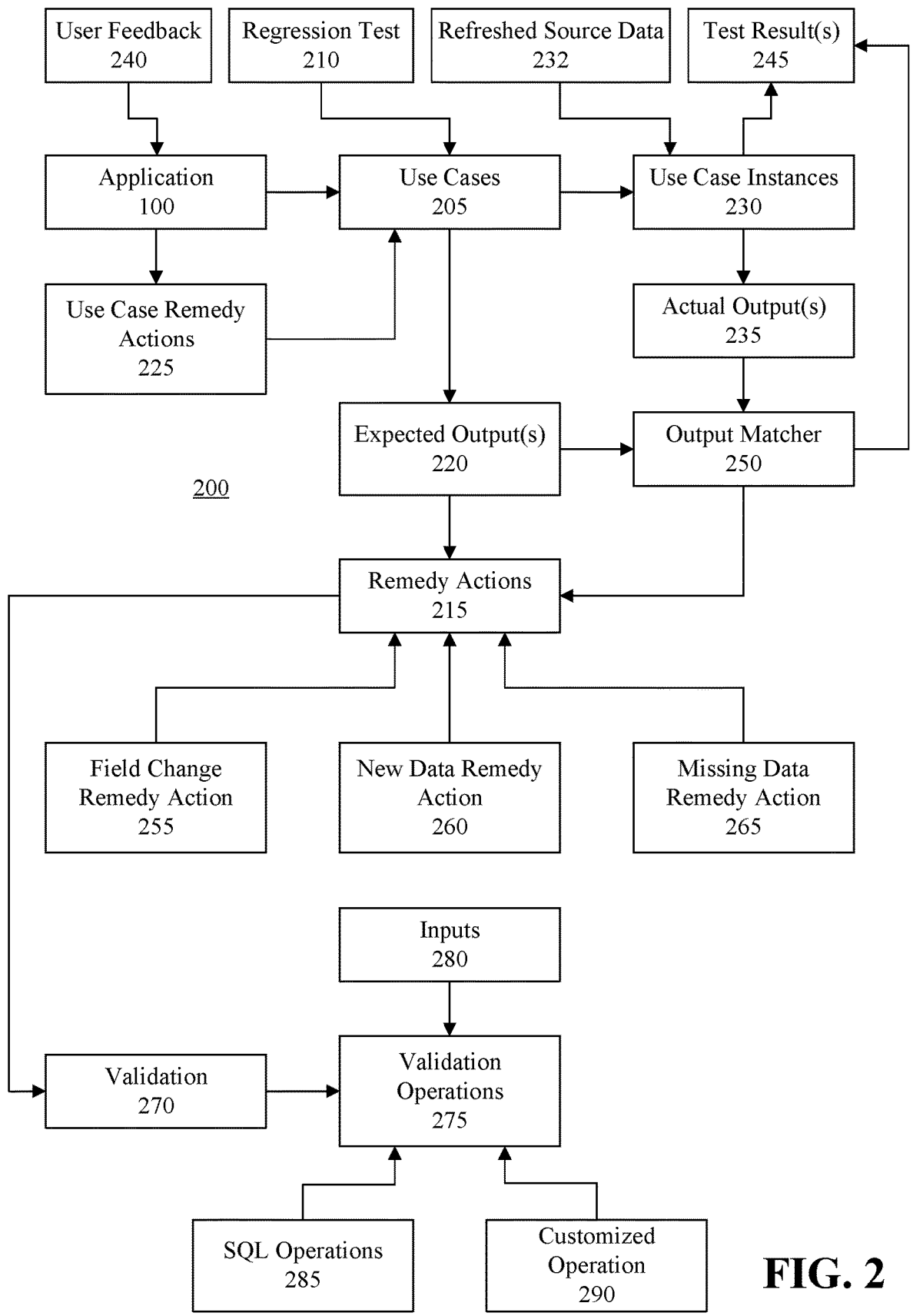
FIG. 2 is a block diagram illustrating an example architecture for updating expected output data.

FIG. 2 is a block diagram illustrating an example architecture 200 for updating expected output data. The application 100 can process use cases 130 and test use cases 140 (FIG. 1), collectively indicated in FIG. 2 as use cases 205. Each use case 205 can be uniquely identified by key data fields specific for each application 100 for which the use case may be used. In genomic analytics, for example, each use case can be uniquely identified by a patient cancer disease code and a patient's gene mutations. One or more regression tests 210 can be defined to test a use case 205 using different data sets. Users also may use the application to process an undefined use case 205. By way of example, the application 100 may analyze a cancer disease and gene mutations which are not covered by the regression tests 210. In this case, the application 100 can invoke an automated remedy action 215 to add a new use case 205 to the system, and then generate a notification, for example a notification communicated to a quality assurance department, to add a coverage to the new use case 205. Further details of the architecture 200 are described with reference to the following flowcharts.

Figure 3:
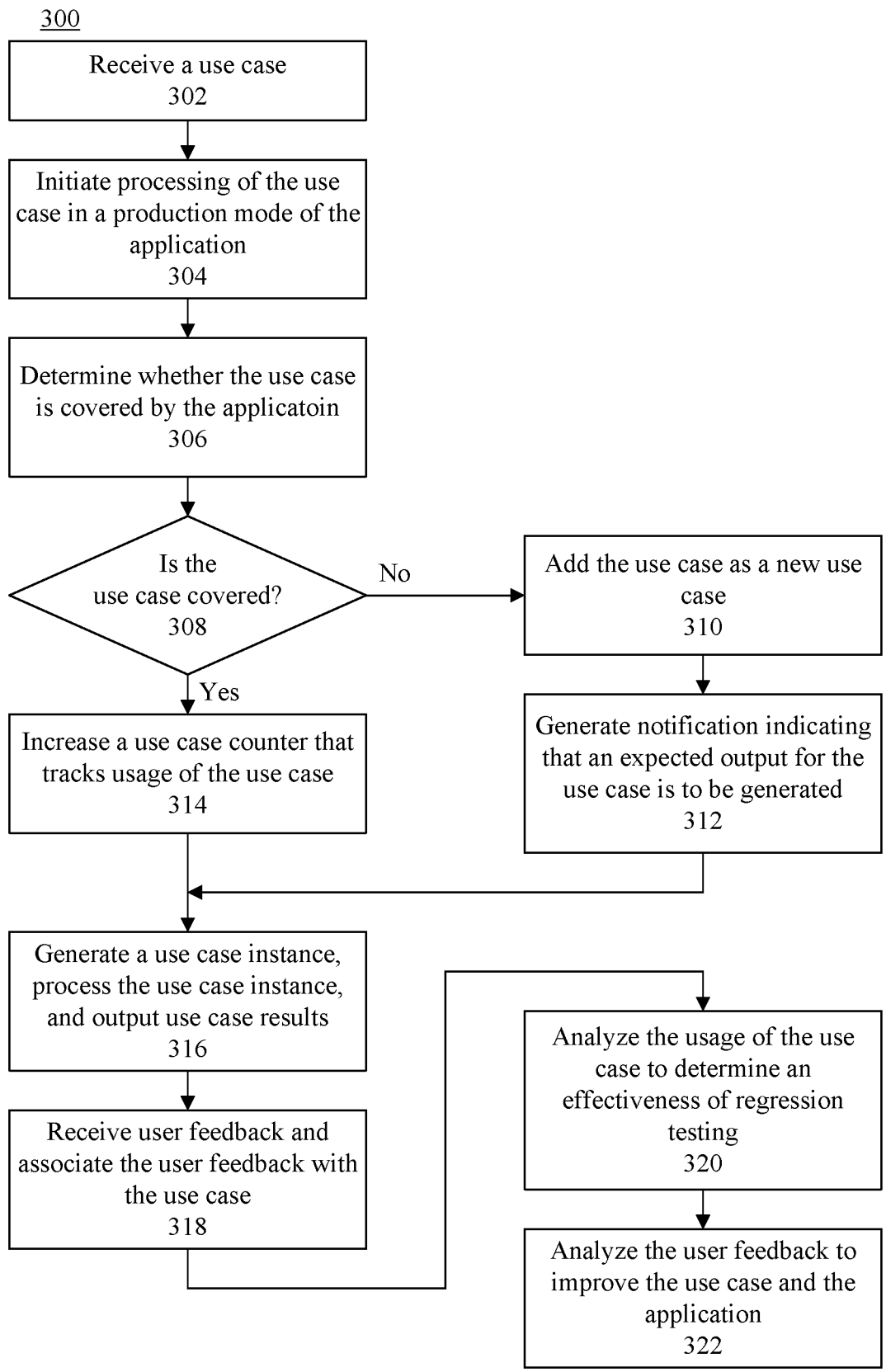
FIG. 3 is a flowchart illustrating an example of a method of tracking and analyzing usage of an application.

FIG. 3 is a flowchart illustrating an example of a method 300 tracking and analyzing usage of the application 100. The method 300 can be performed in real time. In the following description, reference will be made to FIGS. 1, 2 and 3.

At step 302, the application 100 can receive a use case 130. At step 304, the application 100 can initiate processing of the use case 130 in a production mode. At step 306, the application 100 can determine whether the use case 130 is covered by the application. For example, the application 100 can determine whether there is at least one expected output (e.g., a use case output 135 or a test use case output 145) for the use case 130 available to the application 100. Each use case 130 can have one or more sets of expected output data (hereinafter "expected output(s)") 220. In genomic analytics, for example, a first expected output can indicate medications expected to be identified by the application 100 based on the patient disease and gene mutations. A second output can indicate source data (e.g., trial data) expected to be found for the use case. Some use cases, for example new use cases, may not yet have expected outputs 220 defined for the use cases, however.

Referring to decision box 308, if the use case is not presently covered by the application 100 (e.g., an expected output has not been generated/defined), at step 310 the application 100 can add the use case 130 to the use cases 205 as a new use case, for example using a use case remedy action 225. Further, at step 312, the application 100 can generate a notification indicating that an expected output for the user case is to be generated (e.g., defined). The application 100 can communicate the notification to a department (e.g., quality assurance) and/or one or more people assigned to generate expected outputs. Referring again to decision box 308, if the use case is already covered by the application 100, at step 314 the application 100 can increase a use case counter for the use case 130 that tracks usage of the use case 130.

At step 316, the application 100 can generate a use case instance 230 for the use case 130, process the use case instance 230 using refreshed source data 232, and output results of such processing as actual output data (hereinafter "actual output(s)") 235. At step 318, the application 100 can receive user feedback 240 regarding the use case results and associate the user feedback with the use case 130. For example, the user can review the results of the actual output 235, and enter into the application the user feedback 240 pertaining to the results.

At step 320, the application 100 can analyze the usage of the user case to determine an effectiveness of regression testing, for example previously performed regression testing. In illustration, the application 100 can determine, based on the user feedback 240, an accuracy of the actual output 235. If the user feedback 240 indicates that the accuracy of the actual output 235 is good, the application 100 can determine that the effectiveness of the regression testing is high. If the user feedback 240 suggests a number changes to the actual output 235 that is higher than a first threshold level, but does not exceed a second threshold level, the application 100 can determine that effectiveness of the regression testing is moderate. If the user feedback 240 suggests a number changes to the actual output 235 that is higher than the second threshold level, the application 100 can determine that the effectiveness of the regression testing is low.

At step 322, the application 100 can analyze the user feedback to improve the use case 130 and the application 100. For example, the application 100 can improve the use case by implementing a use case remedy action 225 to add to the use case additional information that would serve to provide better searches of the application database 110 (FIG. 1). Further, the application 100 can update one or more of the case analyzers 125 used to process the use case 130. In illustration, the application 100 can update the case analyzer(s) 125 to search for additional information in the application database 110 that the user feedback indicates should be provided in the actual output 235.

The method 300 also can be used to process test use cases 140 in a production mode. Accordingly, production mode testing can be performed for the application 100 using test use cases 140 and case analyzer(s) 125 can be updated accordingly.

Figure 4:
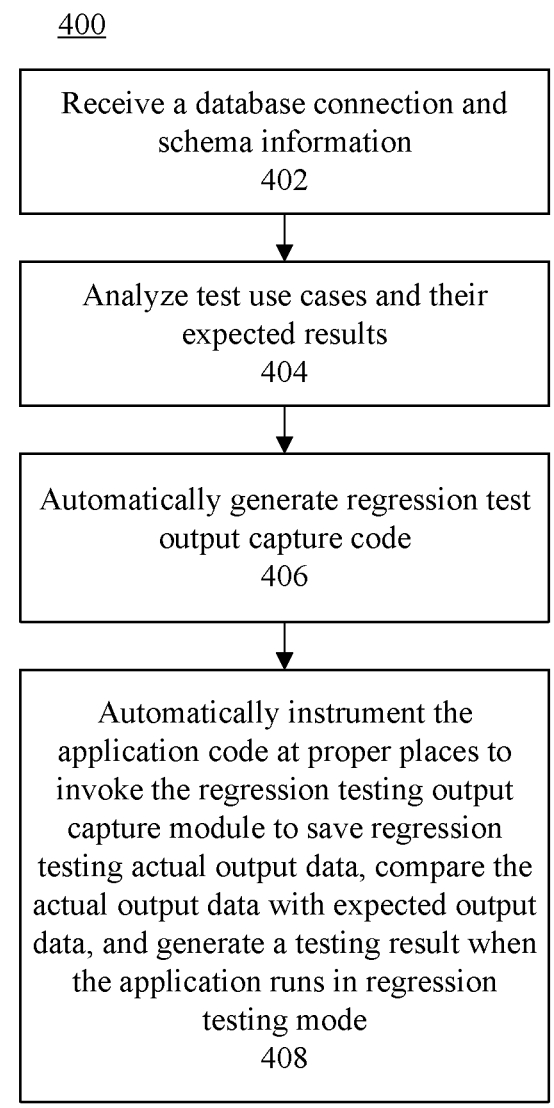
FIG. 4 is a flowchart illustrating an example of a method of automatically generating and using regression test output capture code.

FIG. 4 is a flowchart illustrating an example of a method 400 of automatically generating and using the regression test output capture code 160. The method 400 can be performed in real time. In the following description, reference will be made to FIGS. 1, 2 and 4-7. The method 400 can be implemented during regression mode testing of the application 100.

At step 402, the application 100 can receive a database connection and schema information for the test use case database 150 (FIG. 1). The test use case database 150 can store test use cases 140 and their corresponding test use case outputs (e.g., expected outputs). In one arrangement, the test use cases 140 can be test use cases that are specifically configured for regression mode testing, but this need not be the case. At step 404, the regression test framework 155 of the application 100 can analyze the test use cases 140 and their expected test use case outputs 145.

At step 406, based on the analysis performed at step 404, the regression test framework 155 can automatically generate the regression test output capture code 160. The regression test output capture code 160 can be dynamically generated during regression testing, and can be configured for the specify type of test use cases 140 being used to perform the regression testing. In this regard, different types of use cases may include different types of data, and may use different types of data fields. By configuring the regression test output capture code 160 based on the test use cases 140 being used, the accuracy of the regression testing is improved, and the risk of errors being generated by a data processing system executing the application 100 during the regression testing is mitigated. Further, use of data processing resources (e.g., hardware processor resources and memory resources) by the regression test output capture code 160 during regression testing can be minimized, thereby freeing such data processing resources to be used for other purposes and/or reducing power usage by the data processing resources.

FIG. 5 is a data table 500 presenting an example of source data from which expected output data 220 may be based. In this example, the source data is trial data for clinical trials associated with various medications. The data table 500 can include one or more source data records 510, 512, and each source data record 510, 512 can include a plurality of fields 520, 522, 524, 526, 528, 530, 532. In this example, for each source data record 510, 512 the field 520 can indicate a cancer code, the field 522 can indicate a cancer name, the field 524 can indicate medication(s) tested to treat the cancer, the field 526 can indicate a clinical trial number, the field 528 can indicate a phase of a clinical trial for which the data is generated, the field 530 can indicate a recruitment status of the clinical trial, and the field 532 can indicate a title of the clinical trial. This is merely an example, however, and the source data records 510, 512 can include any of a myriad of other information.

In this example, the source data is refreshed source data 232. For example, the field 530 in the source data record previously may have indicated "Recruiting." That field 530, however, may have been refreshed with updated and/or changed data, and thus may presently indicate "Suspended."

The regression test framework 155 can generate regression test output capture code 160 configured to generate one or more data tables in which to store the expected output 220 for each of the test use cases 140, and store expected output data to such data table(s) as one or more expected output data records. The regression test framework 155 can define in the regression test output capture code 160 the structure of the generated data table(s). For example, the regression test framework 155 can define fields for data table(s) that match fields of the source data presented in the data table 500.

Not all fields of the source data need be included in the generated data tables. Instead, the regression test framework 155 can identify key data fields in the source data that are specifically pertinent to the application 100, and fields related to the key data fields, and include the identified fields in the generated table. Such fields can include fields that correspond to actual output data contained in actual output(s) 235 generated by the application 100 while processing the test use case(s) for which the regression test output capture code 160 is being generated. Accordingly, during regression testing, the expected output 220 can be limited to expected output data that corresponds to actual output data generated by the application 100 while processing the test use case(s) 140. Moreover, field headers (e.g., field names) for the data table(s) can be specified to match field headers for the source data, and thus actual output data that the application 100 will generate processing the selected test use cases 140. This can improve accuracy when comparing actual outputs 235 to expected outputs 220 and mitigate data processing errors which may otherwise occur if the field headers do not match. Specifying the specific data structure of the data table(s) for the expected output(s) 220 in this manner also serves to reduce the amount of data processing resources (e.g., hardware processor resources and memory resources) that are utilized during regression testing, which improves operation of a data processing system executing the application 100, for example during regression testing.

An example of a data table 600 generated to store data for expected output(s) 220 is presented in FIG. 6. The data table 600 can include one or more expected output data records 610, 612. Each data record 610, 612 can include a field 616 indicating the respective test use case 140 to which the data record 610, 612 corresponds. For example, the data records 610, 612 can indicate "UseCase1" to represent a first test use case 140. Each data record 610, 612 also can include each of the fields 620, 622, 624, 626, 628, 630, 632 which, respectively, are defined to match definitions of fields 520-532 for a corresponding source data record 510, 512 of the data table 500. In this example, the data table 600 was generated from the source data of FIG. 5 before the field 530 for the source data record 512 was changed and/or updated from "Recruiting" to "Suspended" during a refresh operation performed to update and/or change the corresponding record 512 in the application database 110. Nonetheless, when the source data is loaded from test use case outputs 145 into the data table 600, that data will comply with the structure of the source data, and thus actual output data that will be generated by processing use case instances 230 of the test use cases 140 (205 in FIG. 2). The regression test output capture code 160 can be configured to, during regression testing, load into memory of the data processing system the data table 600 as an expected output 220.

Figure 7:
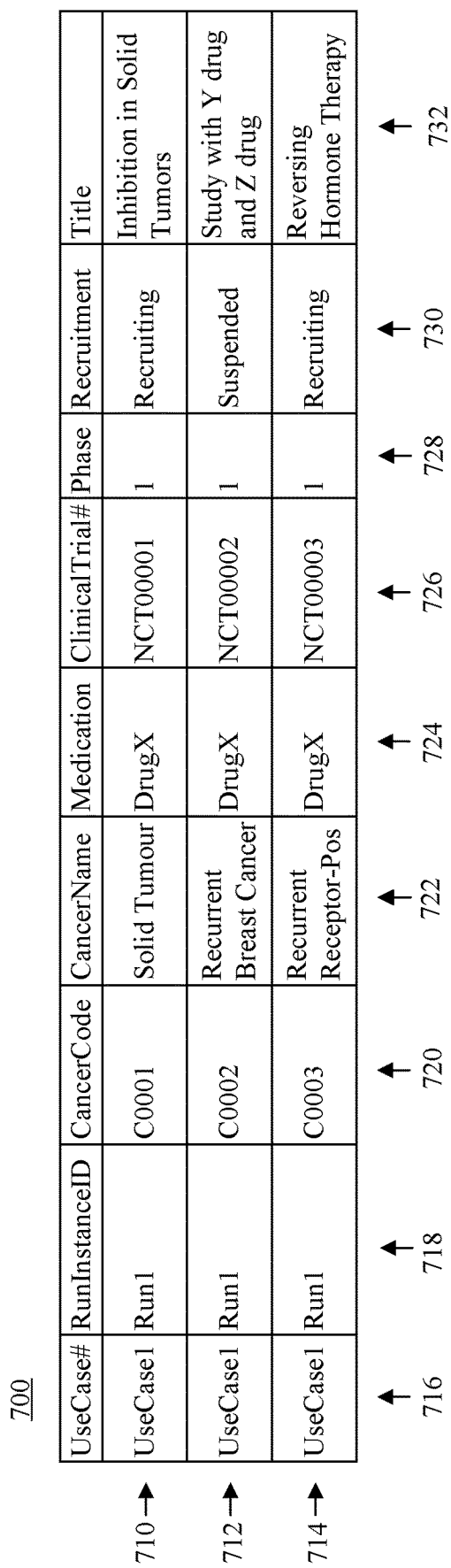
FIG. 7 is a data table presenting an example of data table that stores actual output data.

The regression test output capture code 160 generated by the regression test framework 155 also can be configured to save actual outputs 235 generated by processing the test use case 140 in order to capture testing results. Referring to FIG. 7, an example of a data table 700 presenting an actual output. The data table 700 can include one or more data records 710, 712, 714. Each data record 710, 712, 714 can include a field 716 indicating the respective test use case 140 to which the data record 710, 712, 714 corresponds. For example, each of the data records 710, 712, 714 can indicate "UseCase1" to represent a first test use case 140 being tested. Each data record 710, 712, 714 also can include a field 718 indicating a particular use case instance 230 of the test use case 140 (e.g., run1). Each data record 710, 712, 714 also can include fields 720, 722, 724, 726, 728, 730, 732 which, respectively, correspond to fields 520-532 for a corresponding source data record 510, 512 of the data table 500, but contain actual output data resulting from the present regression testing performed on the test use case 140. The data contained in fields 720-732 may differ from the expected output data table 600 of FIG. 6 if there are differences between the expected output 220 (e.g., previously generated test use case outputs 145) and the actual output 235, however. For example, if the source data contained in the application database 110 changed between a time when the test use case outputs 145 were generated and a time when the test use case 140 is processed during regression testing to generate the actual output 235, the data table 700 may include refreshed source data 232.

In the example presented in FIG. 7, the data "Suspended" of the field 730 in the data record 712 differs from the data "Recruiting" in the field 630 of the data record 612 because the data in the data record 612 was generated before the field 530 of the source record 512 was updated from "Recruiting" to "Suspended." As will be described, automated remedy actions 215 can be implemented to update the expected output data with the refreshed source data 232. Further, the data table 700 can include one or more data records 714 that do not correspond to data records 610, 612 contained in the data table 600, for example if the actual output 235 includes data from the application database 110 not captured in the expected output 220. The data table 700 also may be lacking one or more data records corresponding to data records 610, 612 of the data table 600, for example if processing the use case instance 230 does not capture as actual output 235 data contained in the expected output 220.

At step 408, the regression test framework 155 can instrument the case analyzers 125 of the application 100 at proper places to invoke the regression test output capture code 160 to capture and save regression testing actual output data 235, compare the actual output 235 with expected output data 220, and generate a test result 245 when the application 100 runs in regression testing mode. The regression test framework 155 can include in the regression test output capture code 160 an output matcher 250 configured to compare expected outputs 220 to actual outputs 235. The regression test framework 155 can configure the output matcher 250 to compare the fields specified in the data table (e.g., data table 600) containing the expected output data to corresponding fields of a data table (e.g., data table 700) containing the actual output data, and output results of such comparison.

Figure 8:
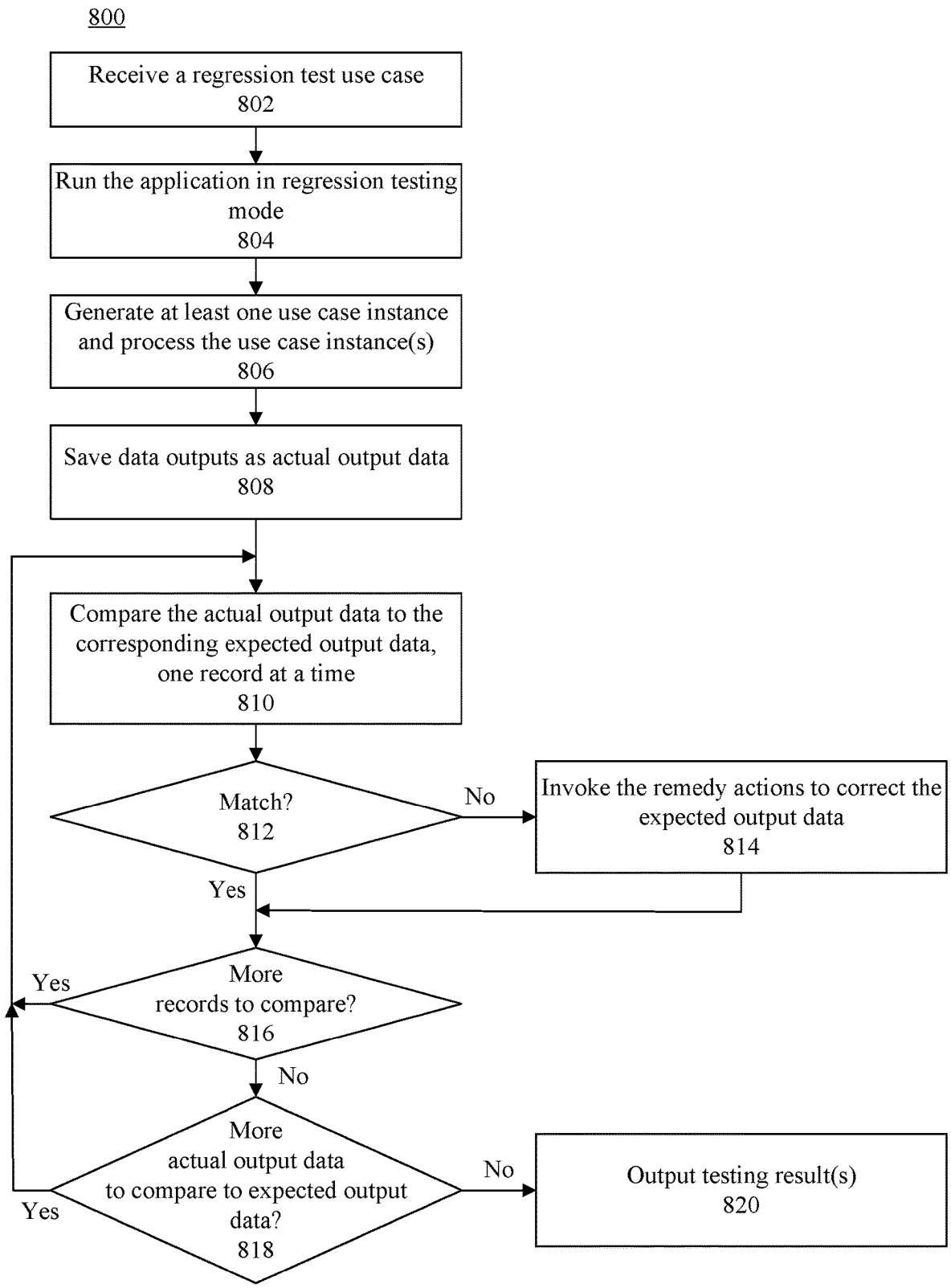
FIG. 8 is a flowchart illustrating an example of a method of performing a regression test.

FIG. 8 is a flowchart illustrating an example of a method 800 of performing a regression test. The method 800 can be performed in real time. In the following description, reference will be made to FIGS. 1, 2 and 5-8.

At step 802 the application 100 can receive a test use case 140 (205 in FIG. 2). At step 804 the application 100 can run in regression mode testing. At step 806, the application 100 can generate at least one use case instance 230 of the test use case 140 and process the use case instances 230. For example, if the same test use case 140 is submitted multiple times by one or more users, a use case instance 230 can be generated for each test use case 140. The application 100 can generate one or more data records of actual output 235 for each test use case 140 based on processing the use case instance 230. At step 808, the application 100 can save the data records of output data as actual outputs 235. For example, the application 100 can create the data table 700 and store the actual output 235 to the data table 700 as data records 712-714. The actual output 235 can indicate a variety of information selected from data records of the application database 110, for example information presented in FIG. 5.

At step 810, the output matcher 250 can match the actual outputs 235 to the expected outputs 220 for the test use case 140. In this regard, the output matcher 250 can load the expected outputs 220, for example from data table 600, into memory, access the actual outputs 235 from memory, and compare the actual output data contained in the actual outputs 235 to the corresponding expected output data contained in the expected outputs 220, beginning with a first actual output data record. Referring to decision box 812, for each data record, if the actual output 235 does not match the expected output 220, at step 814 the application can invoke one or more automated remedy actions 215, which will be described in further detail. Referring to decision box 816, if there are more data records to compare for the present use case instance, the process can return to step 810 and compare the output matcher 250 can compare the actual output data to the corresponding expected output data for a next data record. If there are no further data records to compare for the present use case instance, referring to decision box 818, if there are more actual outputs 235 for one or more additional use case instances 230 to compare to the expected outputs 220, the process can return to step 810, and the output matcher 250 can compare the actual output 235 to the expected output 220 for a next use case instance 230, beginning with a first output data record for that use case instance 230. If there are no more actual outputs 235 for one or more additional use case instances 230 to compare to the expected outputs 220, at step 820 the output matcher 250 can output results of the comparisons as test results 245.

Referring again to step 814, the remedy actions 215 can include, for example, a field change remedy action 255, a new data remedy action 260 and a missing data remedy action 265. The field change remedy action 255 can define actions to be performed to update the expected output data with refreshed source data 232 in response to the value of a data field 720-732 in an actual output data record 710, 712 is different from the value of the matching data field 620-632 in the expected output data record 610, 612. An expected output data record 610, 612 matches to an actual output data record 710, 712 if both data records have the same key values (e.g., CancerCode, Medication, ClinicalTrial #).

The new data remedy action 260 can define actions to be performed in response to an actual output data record 710, 712 of the actual output 235 for a test use case 140 not having a matching data record in the expected outputs 220 for that test use case 140 (e.g., there is no expected output data record 610, 612 that matches the actual output data record 710, 712). In genomic analytics, for example, the application 100 may find in the refreshed source data 232 a new drug or a new clinical trial while processing a test use case 140 that was not included in the expected outputs 220. The new data remedy action 260 can be implemented to validate the new data, and update the corresponding expected output 220 with the refreshed source data 232.

The missing data remedy action 265 can define actions to be performed in response to an expected output data record 610, 612 of the expected output 220 for a test use case 140 not having a matching data record in the actual output 235 for that test use case 140. In genomic analytics, for example, the application 100 may find that a clinical trial is recently closed and no longer in the actual output 235 for the test use case 140. In such case, the missing data remedy action 265 can be implemented to verify the status of the clinical trial and update the expected output 220 for the test use case 140 accordingly.

The application 100 can implement the remedy actions 215 by performing validation 270 on the expected output 220 and/or the actual output 235. The validation 270 can initiate validation operations 275, for example, to determine whether there is a mismatch between the expected output 220 and an actual output 235 for a test use case 140 based on changes in inputs 280. The inputs 280 can, for example, be recent input changes. The validation 270 can initiate one or more validation operations 275 to validate the input changes. Examples of validation operations 275 include, but are not limited to, structured query language (SQL) operations 285 and customized operations 290. A SQL operation 285 can, for example, query an input table to confirm the latest input change. A customized operation 290, for example, can be configured to perform a more complex validation. If a mismatch is expected and caused by a recent input 280 that changes data, a suitable remedy action 215 (e.g., field change remedy action 255, new data remedy action 260 and/or missing data remedy action 265) can be implemented to update the expected output 220 with the refreshed source data 232 automatically.

In illustration, referring to FIG. 6, assume that for the data record 612 for an expected output 220 contains data indicating "recruiting" in the field 630. Also, referring to FIG. 7, assume that for the data record 712 for an actual output 235 contains data indicating "suspended" in the field 730. The application 100 can initiate the validation 270 to determine which data is correct (e.g., whether the fields 530, 630 should indicate "recruiting" or "suspended") by analyzing the data stored in the application database 110. In illustration, the application 100 can specify the following validation operation 275:

ActualOutput.Data record.Recruitment==Select recruitment
from clinicalTrialInputTable where CancerCode=
ActualOutput.Data record.CancerCode and Medication=
ActualOutput.Data record.Medication and clinicalTrial #=
ActualOutput.Data record.clinicalTrial #

The application 100 can automatically generate program code to perform a field change remedy action 255 from the above specification. In illustration, the field change remedy action 255 can generate SQL for a SQL operation 285 by replacing the placeholders ActualOutput.Data record.CancerCode, ActualOutput.Data record.Medication, and ActualOutput.Data record.clinicalTrial # with values of the mismatched actual output data record 712. The application 100 can execute the SQL to access the recruitment data for the clinical trial and compare that data to the data in the field 730 of the actual output data record 712. If the comparison indicates a match, the change is expected, and the application 100 can implement the field change remedy action 255 to update the corresponding field 630 in the expected output data record 612 with the refreshed source data 232. If the comparison does not indicate a match, the application 100 can output an indicator indicating a test error.

In another example, referring to FIG. 7, a new clinical trial NCT0003 may have been created and open for a cancer condition C0003. The data record 714 can include key values CancerCode C0003, Medication DrugX and ClinicalTrial # NCT0003. The data record 714 can be considered a new data record if there is not a matching data record in the expected output 220 (e.g., the expected output data table 600). The application 100 can implement the new data remedy action 260 and the validation 270 to validate the data contained in the data record 714.

In illustration, a first validation operation 275 can determine whether the CancerCode C0003 in the new data record 714 is related to the cancer code of the use case. For instance, the Application 100 can specify validation operation 275 for the first validation:

1==Select count(*) from DieaseCodeTable where diseaseCode=
UseCase.DiseaseCode and relevantDiseaseCode=
ActualOutput.Data record.CancerCode Further, a second validation operation 275 can determine if the new data record is generated from a clinical trial input table (e.g., data table 500). For instance, the Application 100 can specify the following validation operation 275 for the second validation:

ActualOutput.Data record.Phase, ActualOutput.Data record.Recruitment, ActualOutput.Data record.Title==Select
Phase, Recruitment, Title from clinicalTrialInputTable where
CancerCode=ActualOutput.Data record.CancerCode and Drug=
ActualOutput.Data record.Drug and clinicalTrial #=
ActualOutput.Data record. clinicalTrial #

The application 100 can automatically generate from the first validation specification program code configured to perform a new data remedy action 260. In illustration, the new data remedy action 260 can generate first SQL for a SQL operation 285 by replacing the placeholders UseCase.DiseaseCode in the specified first validation operation 275 with the disease code of the test use case 140 and ActualOutput.Data record.CancerCode with the cancer code (e.g., CancerCode C0003) in the new data record 714. The application 100 can execute the first SQL to check if the disease codes are related. If the disease codes are not related, the application 100 can output an indicator indicating a test error.

If, however, the disease codes are related, the application 100 can automatically generate from the second validation specification program code configured to continue the new data remedy action 260. In illustration, the new data remedy action 260 can generate second SQL for a SQL operation 285 by replacing the placeholders in the specified second validation operation 275 with actual values contained in the new data record 714. The application 100 can execute the second SQL to compare the values of the data fields "Phase," "Recruitment," and "Title" in the new data record 714 with the corresponding values in the clinical trial information. If the values do not match, the application 100 can output an indicator indicating a test error. If the values do match, the application 100 can add data from the fields 716, 720-732 representing refreshed source data 232 to the expected output 220. The missing data remedy action 265 and its validation can be specified and implemented in a similar manner.

Changes to the expected output 220 can be saved to the corresponding test use case output(s) 145. Invoking remedy actions to correct expected output data as described herein improves accuracy of results generated by the data processing system when performing regression testing. Specifically, the expected output data can be corrected during a present instance of regression testing, and used for future instances of regression testing. Although future instances of regression testing may further correct the output data, for example if source data applicable to the test use cases 140 being used changes again before the next regression test is performed using those test use cases 140, the level of correction to that expected output data will be minimized.

FIG. 9 is a flowchart illustrating an example of a method 900 of updating expected output data with refreshed source data 232. The method 900 can be performed in real time. In the following description, reference will be made to FIGS. 2 and 9.

At step 902, the application 100 can perform a regression test 210 by the application 100 processing a use case 205. At step 904, the application 100 can compare actual output data 235 generated by the application 100 processing the use case 205 to expected output data 220, and determine whether the actual output data 235 matches the expected output data 220. At step 906, responsive to determining that the actual output data 235 does not match the expected output data 220, the application 100 can compare the actual output data 235 to refreshed source data 232 and determine whether the actual output data 235 matches the refreshed source data 232. At step 908, responsive to determining that the actual output data 235 matches the refreshed source data 232, the application 100 can automatically select an automated remedy action 260, and update, using a processor, the expected output data 220 with the refreshed source data 232 by implementing the automated remedy action 260.

Figure 10:
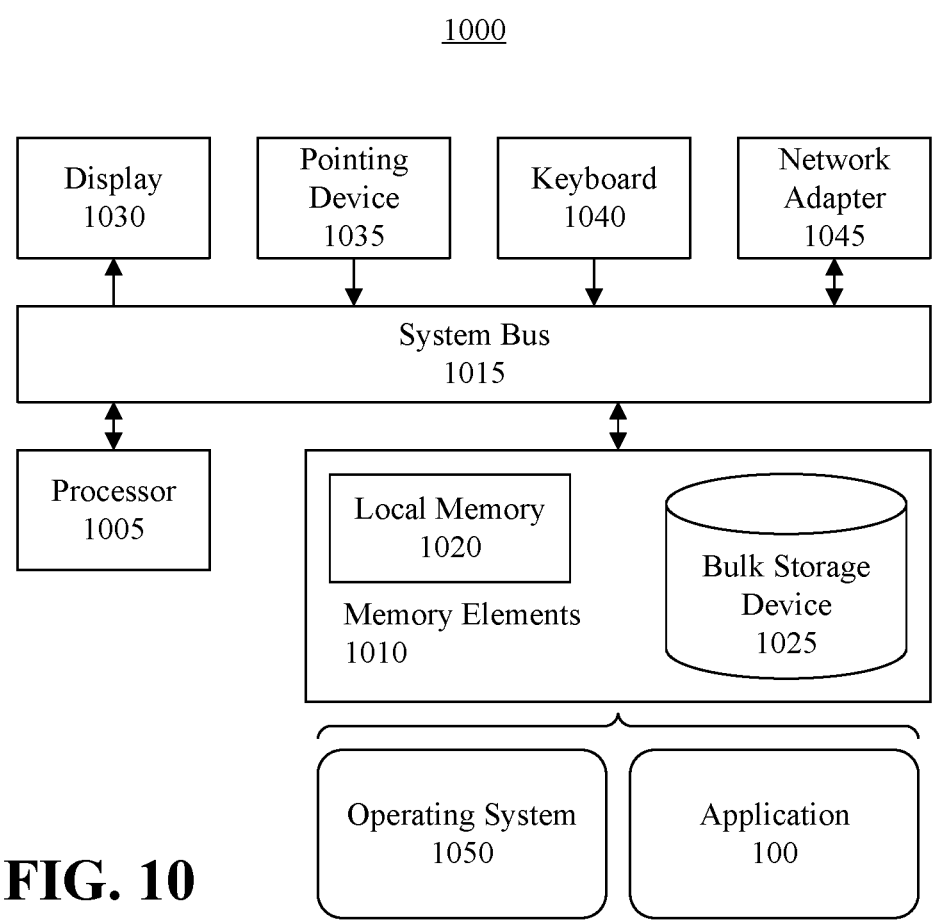
FIG. 10 is a block diagram illustrating example architecture for a data processing system.

FIG. 10 is a block diagram illustrating example architecture for a data processing system 1000. The data processing system 1000 can include at least one processor 1005 (e.g., a central processing unit) coupled to memory elements 1010 through a system bus 1015 or other suitable circuitry. As such, the data processing system 1000 can store program code within the memory elements 1010. The processor 1005 can execute the program code accessed from the memory elements 1010 via the system bus 1015. It should be appreciated that the data processing system 1000 can be implemented in the form of any system including a processor and memory that is capable of performing the functions and/or operations described within this specification. For example, the data processing system 1000 can be implemented as a server, a plurality of communicatively linked servers, a workstation, a desktop computer, a mobile computer, a tablet computer, a laptop computer, a netbook computer, and so on.

The memory elements 1010 can include one or more physical memory devices such as, for example, local memory 1020 and one or more bulk storage devices 1025. Local memory 1020 refers to random access memory (RAM) or other non-persistent memory device(s) generally used during actual execution of the program code. The bulk storage device(s) 1025 can be implemented as a hard disk drive (HDD), solid state drive (SSD), or other persistent data storage device. The data processing system 1000 also can include one or more cache memories (not shown) that provide temporary storage of at least some program code in order to reduce the number of times program code must be retrieved from the bulk storage device 1025 during execution.

Input/output (I/O) devices such as a display 1030, a pointing device 1035 and, optionally, a keyboard 1040 can be coupled to the data processing system 1000. The I/O devices can be coupled to the data processing system 1000 either directly or through intervening I/O controllers. For example, the display 1030 can be coupled to the data processing system 1000 via a graphics processing unit (GPU), which may be a component of the processor 1005 or a discrete device. One or more network adapters 1045 also can be coupled to data processing system 1000 to enable the data processing system 1000 to become coupled to other systems, computer systems, remote printers, and/or remote storage devices through intervening private or public networks. Modems, cable modems, transceivers, and Ethernet cards are examples of different types of network adapters 1045 that can be used with the data processing system 1000.

As pictured in FIG. 10, the memory elements 1010 can store the components of the data processing system 1000, namely an operating system 1050 and the application 100. Being implemented in the form of executable program code, these components of the data processing system 1000 can be executed by the data processing system 1000 and, as such, can be considered part of the data processing system 1000. Moreover, the application 100 and components used/processed by the application 100 (e.g., application database 110, big data analyzer 120, case analyzers 125, test use case database 150, use cases 130, use case outputs 135, test use cases 140, test use case outputs 145, regression test framework 155 and regression test output capture code 160 of FIG. 1, and components 205, 210, 215, 220, 225, 230, 245, 250, 255, 260, 265, 275, 285, 290 of FIG. 2) are functional data structures that impart functionality when employed as part of the data processing system 1000.

Each of expected outputs 220, actual outputs 235, test results 245 and various other outputs generated by the application 100 can be output to, and stored within, the memory elements 1010. As used herein, "outputting" and/or "output" can mean storing in the memory elements 1010, for example, writing to a file stored in the memory elements 1010, writing to the display 1030 or other peripheral output device, playing audible notifications, sending or transmitting to another system, exporting, or similar operations.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions data recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   an application performing a regression test by the application processing a use case;
   comparing actual output data generated by the application processing the use case to expected output data and determining whether the actual output data matches the expected output data;
   responsive to the determining that the actual output data does not match the expected output data, comparing the actual output data to refreshed source data and determining whether the actual output data matches the refreshed source data; and
   responsive to the determining that the actual output data matches the refreshed source data, automatically selecting at least a first automated remedy action, and updating, using a processor, the expected output data with the refreshed source data by implementing the first automated remedy action, wherein the first automated remedy action is a new data remedy action that defines actions to be performed to update the expected output data for the use case in response to an actual output data record of the actual output data not having a matching data record in the expected output data for the use case.

2. The method of claim 1, further comprising:
   responsive to the determining that the actual output data matches the refreshed source data, automatically selecting a second automated remedy action, and updating the expected output data with the refreshed source data by implementing the second automated remedy action, wherein the second automated remedy action is a field change remedy action that defines actions to be performed to update the expected output data for the use case in response to a value of a data field in the actual output data for the use case being different than a value of a matching data field in the expected output data.

3. The method of claim 1, further comprising:
   responsive to the determining that the actual output data matches the refreshed source data, automatically selecting a second automated remedy action, and updating the expected output data with the refreshed source data by implementing the second automated remedy action, wherein the second automated remedy action is a missing data remedy action that defines actions to be performed to update the expected output data for the use case in response to an expected output data record of the expected output data not having a matching data record in the actual output data for the use case.

4. The method of claim 1, further comprising:
   automatically generating regression test output capture code based, at least in part, on the expected output data, the regression test output capture code configured to perform:
      creating a first data table and storing the expected output data to the first data table;
      creating a second data table and storing the actual output data to the second data table; and
      performing the comparing the actual output data to the expected output data;
   wherein the regression test output capture code is invoked by the application during the regression test.

5. The method of claim 4, further comprising:
   analyzing the use case and the expected output data;
   wherein automatically generating regression test output capture code is based on the analyzing the use case and the expected output data.

6. The method of claim 4, further comprising:
   instrumenting the application to invoke the regression test output capture code during the regression testing.

7. A system, comprising:
   a processor programmed to initiate executable operations comprising:
   an application performing a regression test by the application processing a use case;
   comparing actual output data generated by the application processing the use case to expected output data and determining whether the actual output data matches the expected output data;
   responsive to the determining that the actual output data does not match the expected output data, comparing the actual output data to refreshed source data and determining whether the actual output data matches the refreshed source data; and
   responsive to the determining that the actual output data matches the refreshed source data, automatically selecting at least a first automated remedy action, and updating the expected output data with the refreshed source data by implementing the first automated remedy action, wherein the first automated remedy action is a new data remedy action that defines actions to be performed to update the expected output data for the use case in response to an actual output data record of the actual output data not having a matching data record in the expected output data for the use case.

8. The system of claim 7, the executable operations further comprising:
   responsive to the determining that the actual output data matches the refreshed source data, automatically selecting a second automated remedy action, and updating the expected output data with the refreshed source data by implementing the second automated remedy action, wherein the second automated remedy action is a field change remedy action that defines actions to be performed to update the expected output data for the use case in response to a value of a data field in the actual output data for the use case being different than a value of a matching data field in the expected output data.

9. The system of claim 7, the executable operations further comprising:
   responsive to the determining that the actual output data matches the refreshed source data, automatically selecting a second automated remedy action, and updating the expected output data with the refreshed source data by implementing the second automated remedy action, wherein the second automated remedy action is a missing data remedy action that defines actions to be performed to update the expected output data for the use case in response to an expected output data record of the expected output data not having a matching data record in the actual output data for the use case.

10. The system of claim 7, the executable operations further comprising:
automatically generating regression test output capture code based, at least in part, on the expected output data, the regression test output capture code configured to perform:
creating a first data table and storing the expected output data to the first data table;
creating a second data table and storing the actual output data to the second data table; and
performing the comparing the actual output data to the expected output data;
wherein the regression test output capture code is invoked by the application during the regression test.

11. The system of claim 10, the executable operations further comprising:
analyzing the use case and the expected output data;
wherein automatically generating regression test output capture code is based on the analyzing the use case and the expected output data.

12. The system of claim 10, the executable operations further comprising:
instrumenting the application to invoke the regression test output capture code during the regression testing.

13. A computer program product, comprising:
a computer readable storage medium having program code stored thereon, the program code executable by a data processing system to initiate operations including:
an application performing a regression test by the application processing a use case;
comparing actual output data generated by the application processing the use case to expected output data and determining whether the actual output data matches the expected output data;
responsive to the determining that the actual output data does not match the expected output data, comparing the actual output data to refreshed source data and determining whether the actual output data matches the refreshed source data; and
responsive to the determining that the actual output data matches the refreshed source data, automatically selecting at least a first automated remedy action, and updating the expected output data with the refreshed source data by implementing the first automated remedy action, wherein the first automated remedy action is a new data remedy action that defines actions to be performed to update the expected output data for the use case in response to an actual output data record of the actual output data not having a matching data record in the expected output data for the use case.

14. The computer program product of claim 13, wherein the program code is executable by the data processing system to initiate operations further comprising:
responsive to the determining that the actual output data matches the refreshed source data, automatically selecting a second automated remedy action, and updating the expected output data with the refreshed source data by implementing the second automated remedy action, wherein the second automated remedy action is a field change remedy action that defines actions to be performed to update the expected output data for the use case in response to a value of a data field in the actual output data for the use case being different than a value of a matching data field in the expected output data.

15. The computer program product of claim 13, wherein the program code is executable by the data processing system to initiate operations further comprising:
responsive to the determining that the actual output data matches the refreshed source data, automatically selecting a second automated remedy action, and updating the expected output data with the refreshed source data by implementing the second automated remedy action, wherein the second automated remedy action is a missing data remedy action that defines actions to be performed to update the expected output data for the use case in response to an expected output data record of the expected output data not having a matching data record in the actual output data for the use case.

16. The computer program product of claim 13, wherein the program code is executable by the data processing system to initiate operations further comprising:
automatically generating regression test output capture code based, at least in part, on the expected output data, the regression test output capture code configured to perform:
creating a first data table and storing the expected output data to the first data table;
creating a second data table and storing the actual output data to the second data table; and
performing the comparing the actual output data to the expected output data;
wherein the regression test output capture code is invoked by the application during the regression test.

17. The computer program product of claim 16, wherein the program code is executable by the data processing system to initiate operations further comprising:
analyzing the use case and the expected output data;
wherein automatically generating regression test output capture code is based on the analyzing the use case and the expected output data.

* * * * *